United States Patent [19]

Wosegien et al.

[11] 4,402,388
[45] Sep. 6, 1983

[54] ADJUSTABLE BRAKE RIGGING FOR RAIL VEHICLES

[75] Inventors: Bernd Wosegien; Josef Staltmeir, both of Munich, Fed. Rep. of Germany; Nils B. L. Sander, Osby, Sweden

[73] Assignee: Knorr-Bremse GmbH, Munich, Fed. Rep. of Germany

[21] Appl. No.: 261,186

[22] PCT Filed: Sep. 11, 1980

[86] PCT No.: PCT/DE80/00130
§ 371 Date: May 19, 1981
§ 102(e) Date: May 7, 1981

[87] PCT Pub. No.: WO81/00835
PCT Pub. Date: Apr. 2, 1981

[30] Foreign Application Priority Data

Sep. 19, 1979 [DE] Fed. Rep. of Germany ....... 2937752

[51] Int. Cl.$^3$ ...................... B61H 15/00; B61H 1/00; F16D 65/60
[52] U.S. Cl. ........................................ 188/56; 188/202
[58] Field of Search ................... 188/75, 76, 74, 77 R, 188/77 W, 17, 18 R, 153 A, 153 R, 196, 197-203, 214-215, 56, 28, 46, 233.3, 233

[56] References Cited

U.S. PATENT DOCUMENTS 3,624,766 11/1971 Sander ............................ 188/56 X
3,782,511 1/1974 Parfitt ............................. 188/56 X
4,136,760 1/1979 Sander ............................. 188/56 X

FOREIGN PATENT DOCUMENTS 15582 9/1980 European Pat. Off. .
2527920 1/1976 Fed. Rep. of Germany .
2542646 9/1976 Fed. Rep. of Germany .
2823843 12/1979 Fed. Rep. of Germany .
1463955 11/1965 France .
2233211 1/1975 France .

Primary Examiner—Douglas C. Butler
Attorney, Agent, or Firm—Edmund M. Jaskiewicz

[57] ABSTRACT

A braking apparatus for rail vehicles has a brake actuating unit to one side of the vehicle wheel. A pair of brake shoes oppositely disposed on both sides of the wheel can be pressed against the contact surface of the wheel. A first vertical braking lever is pivotable under a force from the brake actuating unit with respect to the contact force exerted by the first brake shoe. A second vertical braking lever is similarly connected to the other brake shoe. The lower ends of both braking levers are pivotally connected with two traverse members each interconnecting the ends of two parallel tie rods which extent horizontally across both faces of the vehicle wheel. The play or clearance in the application of the brake shoes to the wheel contact surface is automatically adjusted by a self-actuating device in each tie rod. Each adjusting device comprises a screw coupling consisting of a nut threaded on a spindle shaft. There is a single control device on a traverse member by which both screw couplings are jointly actuated.

12 Claims, 6 Drawing Figures

ADJUSTABLE BROKE RIGGING FOR RAIL VEHICLES

The present invention relates to a braking device for rail vehicles wherein a pair of brake shoes on opposite sides of the wheel are interconnected by parallel tie rods extending across both faces of the wheel, more particularly, to such a braking device having a mechanism for adjusting the lengths of the tie rods.

It has been known to provide a braking device for rail vehicles wherein two brake shoes on opposite sides of a railway wheel in the plane of the wheel are pressed against the contact surface of the wheel by a system of levers upon operation of a braking actuating unit. A first vertical braking lever is pivotable under a reaction force with respect to the contact force applied by the first brake shoe. The lower end of the first braking lever is pivotally connected with the ends of two parallel tie rods which are horizontal and cross over the opposed faces of the vehicle wheel. The other ends of the tie rod are connected to the lower end of a second vertical braking lever positioned opposite to the first braking lever and to which is connected a second braking shoe which is substantially opposite the first brake shoe. The ends of the tie rods are interconnected by traverse members and a self-acuating structure is provided for adjusting the play or release stroke of the brake shoes. This adjusting structure comprises a screw coupling enclosing a threaded spindle and a nut. Such a braking device was proposed in DE-OS No. 25 51 225 and it was subsequently proposed to combine this braking device with a particular modification of the first braking lever as a multistage transmission gearing.

In such braking devices the adjusting structure is generallly disposed in the vicinity of the connection between the first braking lever and the tie rods and when inoperative or at rest is normally disposed between both tie rods. When the tie rods are displaced, the adjusting structure may be then disposed in that space adjacent that side of the first braking lever opposite the vehicle wheel. This space, however, is generally occupied by other components of the rail vehicle, and particularly the braking mechanism of another vehicle wheel. Accommodating such a braking system and its adjusting structure in a manner to facilitate its use therefore constituted a problem.

It was then proposed in FR-PS No. 1 463 955 to connect the lower ends of both braking levers by only one tie rod which passes across one face of the vehicle wheel. The length adjusting structure was then built into the tie rod and was actuated by a suitable control. However, this braking device had the disadvantage that a high magnitude of torque or flexural stress was produced in the braking levers, the connections of the braking levers to the tie rod and in the tie rod itself becuase of this offset arrangement of the brake shoes and the tie rod.

To avoid this disadvantageous unbalancing of the components it was then proposed to utilize two tie rods passing across both faces of the vehicle wheel and connected to the opposed brake levers. This, however, necessitated two complete adjusting structures each of which would be able to function independently with respect to the other. This proposal would thus be a very costly and disadvantageous solution to the problem.

In DE-OS No. 25 27 920 there was disclosed a stroke adjusting device built into the brake cyclinder and this device utilized a non-self-locking screw coupling consisting of a nut threaded upon a rotatable spindle shaft on the end of which is a coupling flange. Both sides of the coupling flange are engageable with stationary coupling surfaces. The spindle shaft is spring-loaded in the direction of the braking force to be transmitted and acts together with a resilient stop against the spring force after there has been a predetermined stroke or displacement of the brake shoe. The non-rotatable nut is then spring-loaded in the direction of the braking force to be transmitted.

It is therefore the principal object of the present invention to provide an improved braking device of the type described herein wherein the forces applied by the brake shoes upon the wheel surface will not cause any torque or flexural stresses in the components.

It is another object of the present invention to provide such a braking device having a structure to adjust jointly the lengths of the tie rods and which adjusting structure occupies a minimum of space and is located so as not to interfere with other components of the railway vehicle.

It is an additional object of the present invention to provide such a braking device which is effective in operation, simple in construction and relativey low in costs both to construct and install.

The foregoing objects are achieved by the present invention which essentially provides a combined control device on a traverse member between the ends of both tie rods and each of the tie rods has a screw coupling actuated by the combined control device. Since only a single control device is necessary the construction cost is held to a minimum and simultaneous actuation of the screw couplings is assured so that the lengths of both tie rods are always adjusted simultaneously in equal amounts so as to avoid any unbalance of forces in the braking device upon application of braking forces.

According to one aspect of the present invention a braking device for rail vehicles may comprise a brake actuating unit disposed radially to one side of a vehicle wheel. A first brake shoe is positioned adjacent a contact surface of the wheel and a first substantially vertical pivotally mounted brake lever is operatively connected to the first brake shoe. The first brake lever is pivotable under a reaction force from the actuating unit with respect to a contact force of the first brake shoe applied to the vehicle wheel. A pair of parallel tie rods are pivotally connected at their one ends to the lower end of the first brake lever and extend horizontally across both faces of the wheel. A second substantially vertical pivotally mounted brake lever is disposed opposite the first brake lever with respect to the wheel and has its lower end pivotally connected to the other ends of the tie rods. A second brake shoe is operatively connected to the second brake lever substantially opposite to the first brake shoe. The tie rods are interconnected by traverse means. Automatic slack or length adjusting means are provided on the tie rods. Length adjusting means comprises a screw coupling on each of the tie rods and each screw coupling comprises a pivotable threaded spindle shaft and a nut. A control device is provided on the traverse means between the two tie rods to actuate both of the screw couplings.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
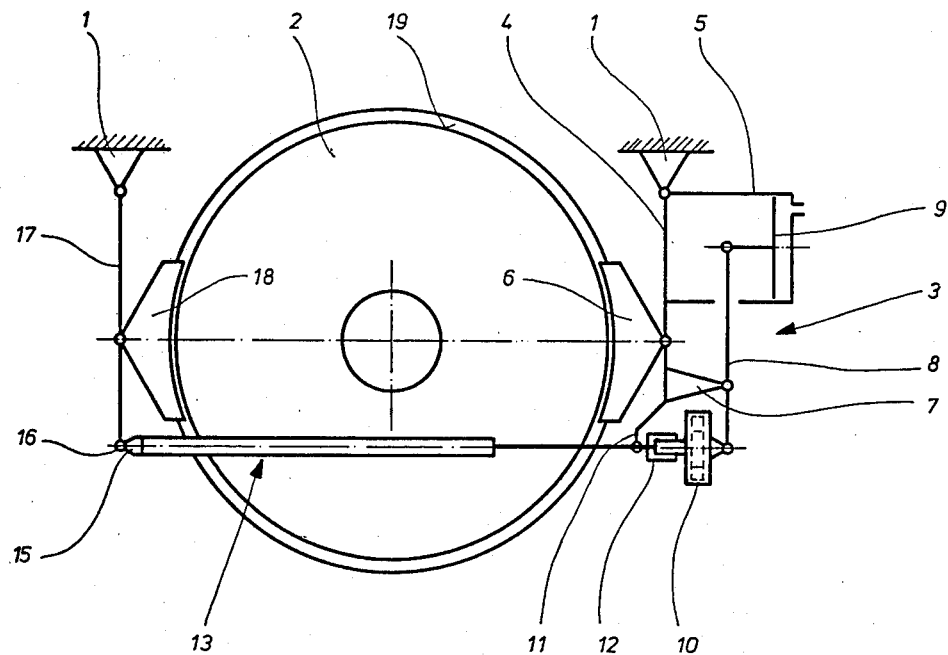
FIG. 1 shows schematically a side elevational view of the braking device according to the present invention and further showing the double transmission linkage of the brake lever acted upon by the brake actuating unit.

In FIG. 1 there is indicated at 1 a portion of a railway vehicle frame and a flanged railway vehicle wheel 2 which is mounted on the frame in the conventional manner. Laterally of the wheel 2 and in the plane of the wheel there is pivotally mounted a first brake lever 3. The brake lever system 3 comprises a substantially vertical support lever 4 the upper end of which is pivotally connected to the vehicle frame 1. On the side of the lever 4 away from the vehicle wheel 2 but in the vicinity of the wheel, there is mounted a brake cylinder 5 which functions as the brake actuator. On the lower central portion of the lever 4 there is mounted a first brake shoe 6 which is engageable with a contact surface of the wheel 2. On the lower end of lever 4 there is mounted a bearing block 7 to which is pivotally connected a brake lever 8 arranged substantially parallel to the support lever 4. The upper end of the brake lever 8 is pivotally connected to the piston 9 of the brake cylinder and the lower end of the brake lever 8 is connected to a traverse member 10 which will be subsequently described.

The lower end of the support lever 4 is elongated by an extension 11 which is connected to a spring device 12 which in turn is connected with the traverse member 10.

Figure 2:
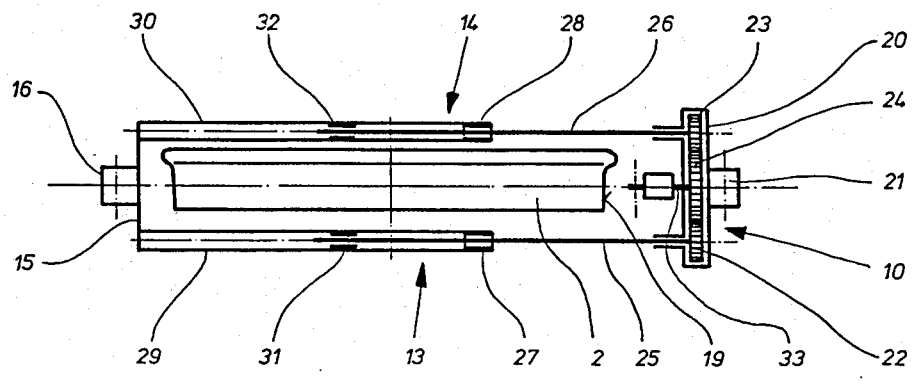
FIG. 2 is a top plan view of a braking device of FIG. 1.

As can be seen in FIG. 2, the traverse member 10 is substantially parallel to the axis of rotation of the vehicle wheel 2. Extending from a lateral edge of traverse member 10 are two parallel tie rods 13 and 14 which extend horizontally across both faces of the vehicle wheel. The other ends of the tie rods 13 and 14 are connected by a second traverse member 15 upon which is mounted a bearing block 16 to which is pivotally connected the lower end of a second brake lever 17. The brake lever 17 is substantially vertical and has its uper end pivotally connected to the vehicle frame 1. To its central portion there is connected a second brake shoe 18 which is opposed from the first brake shoe 6 and engageable with the contact surface 19 of the vehicle wheel. The components of the braking device are illustrated in FIG. 1 in their released position in which both brake shoes 6 and 18 are illustrated in their normal released positions spaced from contact surface 19 of the vehicle wheel. When air under pressure is admitted into the brake cylinder 5, the pressurized air acts upon piston 9 such that the piston 9 and the upper end of brake lever 8 are moved to the left as viewed in FIG. 1. The bearing block 7 is also moved to the left and this movement of the bearing block moves the lower end of the support lever 8 to the left as a result of which the first brake shoe 6 is moved into contact and pressed against the contact surface 19 of the vehicle wheel 2. Because of the contact of the brake shoe 6 with the wheel, the brake lever 8 will pivot about the bearing block 7 such that the traverse member 10 together with the connected tie rods 13 and 14 and the traverse member 15 are moved to the right. The pivot connection 16 on the lower end of the second brake lever 17 thus also moves to the right and, accordingly, presses the second brake shoe 18 against the contact surface 19 of the vehicle wheel 2. A braking force is thus exerted which corresponds to the transmission ratio of the linkage of the braking device.

When the brakes are released, the components function oppositely to that as described above.

Figure 4:
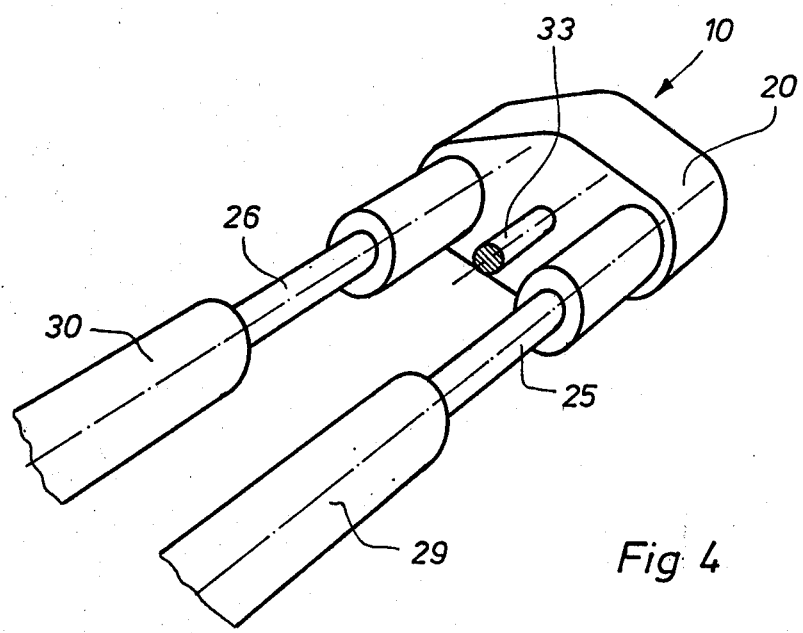
FIG. 4 is a perspective view showing the traverse member housing the transmission structure of FIG. 3 and end portions of the connected tie rods.

The traverse member 10 as shown in FIG. 2 comprises a rigid housing 20 which is illustrated in greater detail in FIG. 4. Attached to the housing 20 is a bearing block 21 to which the lower end of the brake lever 8 is pivotally connected. Within both ends of the housing 20 are two rotatably mounted gears 22 and 23 which are further provided with axial or thrust bearings but not shown in FIG. 2 to limit their axial movement. Both gears 22 and 23 are in mesh with an intermediate gear 24. The gears 22 and 23 have their sides away from the bearing block 21 connected to threaded spindle shafts 25 and 26 respectively which are components of the tie rods 13 and 14. The spindle shafts are provided with self-locking threads upon which are threaded nuts 27 and 28. The nuts 27 and 28 are fixed within the ends of tubular members 29 and 30 the other ends of which are fixedly connected to the traverse member 15. The spindle shafts 25 and 26 are thus the rotatable coupling elements and the nuts 27 and 28 are the non-rotatable coupling elements of the two screw couplings 25,27 and 26,28 of the tie rods 13 and 14 respectively.

The tubular elements 29 and 30 are also provided with slide bearings 31 and 32 to guide the inner ends of the spindle shafts 25 and 26.

Extending from the traverse housing 20 between the threaded shafts 25 and 26 is an intermediate shaft 33 whose inner end is connected to the intermediate gear 24 and which provides a control device for rotation of the intermediate gear 24. For purposes of clarity, the structure comprising the traverse member 10 with its housing 20, the threaded spindle shafts 25 and 26 together with the tubular elements 29 and 30 and the intermediate shaft 33 are illustrated in perspective in FIG. 4.

Figure 3:
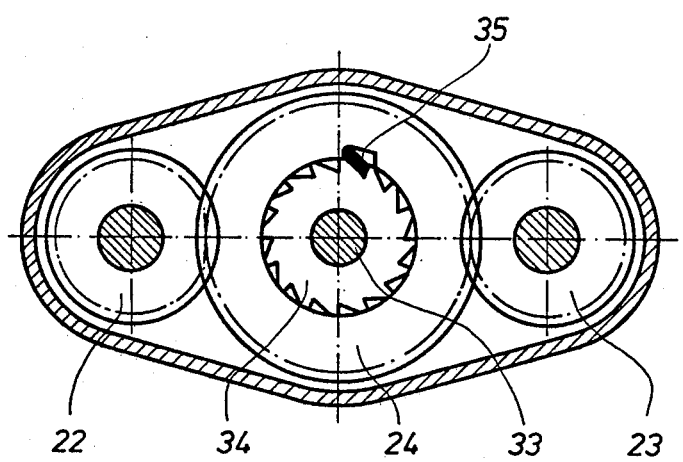
FIG. 3 is a sectional view in enlarged scale of the gear transmission system between the two tie rods.

As may be seen in FIG. 3, within the intermediate gear 24 there is journaled a ratchet gear 34 which is attached to the end of the intermediate shaft 33 and is engageable with a ratchet 35 mounted on the intermediate gear 24 and urged by a spring into engagement with the teeth of the ratchet gear 34. Since the ratchet gear 34 is rigidly connected to the intermediate shaft 33, the ratchet 35 and the ratchet gear 34 provide a uni-directional coupling 34,35 between the intermediate shaft 33 and the intermediate gear 24. The uni-directional coupling is provided with a backlash or lost motion the magnitude of which corresponds to the distance between the teeth on the ratchet wheel and which are proportional to or may be equal to the stroke or displacement traveled by the brake shoes from the released positions to initial contact with the contact surface of the vehicle wheel.

The intermediate shaft 33 may be provided outside of the housing 20 with a helical shaped groove for rotary operation of an adjusting device in a known manner in which a slide ring is engaged either directly or over the spring device 12 connected with the support lever 11 for only axial displacement with respect to the intermediate shaft 33. As already described, during braking the resulting relative movement between the support lever extension 11 and the traverse member 10 will be converted into rotary movement of the intermediate shaft 33. The maximum rotation of the intermediate shaft 33 can thus be limited by the spring device 12 during application of the brakes without overstressing any of the components of the braking device. However, it is preferable to provide a rotary device for the intermediate shaft 33 of the structure as illustrated in FIG. 5.

Figure 5:
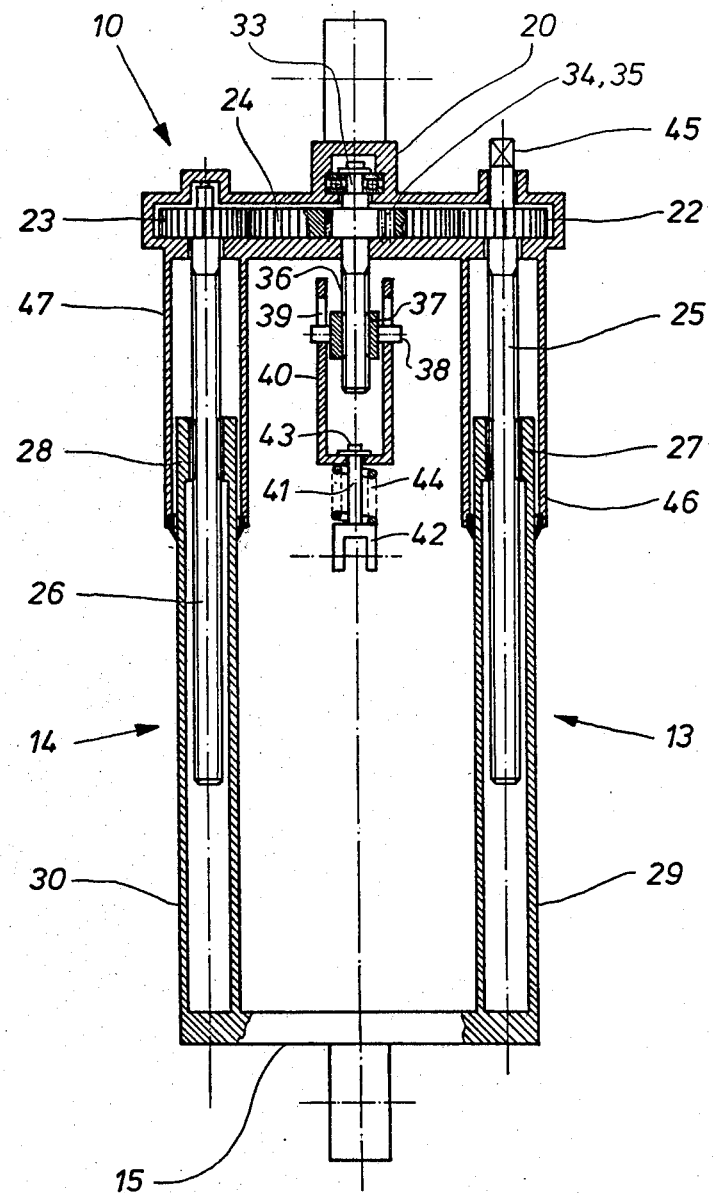
FIG. 5 is a horizontal sectional view of the tie rod and transmission structure according to the present invention.

As may be seen in FIG. 5, the intermediate gear 24 which meshes with the gears 22 and 23 without any play is coupled to the intermediate shaft 33 by a uni-directional coupling 34,35 which functions on the principle of clamping members. The intermediate shaft 33 is rotatable but is not axially displaceable in the housing 20 of the traverse member 10. On a portion of the intermediate shaft 33 projecting outwardly of the housing 20 there is provided a non-self-locking thread 36 upon which is threaded a drive nut 37. Extending laterally from opposed sides of the drive nut 37 are pins 38 which are slideably received in slots 39 formed in the arms of a fork-shaped bracket 40. The bracket 40 is positioned coaxially with the intermediate shaft 33 and is provided on its base portion with a square hole in which is received an axially displaceable square bolt 41. On the end of the bolt 41 is a fork-shaped member 42 which is pivotally connected to the support lever extension 11 along an axis which is parallel to the axis of the wheel 2. The bolt 41 is provided with a head 43 which is seated on the inner face of the base of the bracket 40 and between the outer surface of the base of the bracket 40 and the forked member 42 there is positioned a spring 44. By means of the support lever extension 11, the forked member 42, the bolt 41, the forked bracket 40, the slots 39 and the pins 38, the drive nut 37 is axially displaceable on the intermediate shaft 33 but is non-rotatable with respect to the intermediate shaft. FIG. 5 further clearly illustrates the tie rods 13 and 14 and the interrelationship of their components including the threaded spindle shafts 25 and 26, the nuts 27 and 28 and the tubular elements 29 and 30 the ends of which are connected to the traverse member 15.

When the brakes are released, the components of the braking device are in the positions as shown in FIG. 5. During braking, the traverse member 10 and the support lever extension 11 move away from each other. The forked bracket 40 follows the movement of the support lever extension 11 by means of the bolt head 43 of the bolt 41 while the intermediate shaft 33 follows the movement of the traverse member 10. At that time the drive nut 37 follows the movement of the intermediate shaft 33 upon which it is non-rotatably threaded because of friction. The pin 38 then moves within the slot 39. The play of the brakes or the stroke distance of the brakes before they engage the contact surface corresponds to the movement of the pin 38 to the other end of the slot 39.

When the brakes are released, the individual parts function in a corresponding manner but in a reverse direction.

However, the situation may arise where the brake stroke increases such as, for example, because of wear of the brake shoes, such that the pin 38 contacts the end of the slot 39 near the traverse member 10 before the end of the contact stroke. During the remainder of the contact stroke the drive nut 37 will be carried along by the bracket 40 by means of the pin 38 and thus follows the movement of the suport lever extension 11. The intermediate shaft 33 then begins to rotate because of the non-self-locking thread 36. The uni-directional coupling 34,35 is free to move in this direction of rotation of the intermediate shaft 33 so that the intermediate gear 24 remains in position.

During the next succeeding release of the brakes, the intermediate shaft 33 initially remains in position so that the pin 38 slides in the slot 39 in the direction away from the traverse member 20 and reaches this end before the termination of the release operation. During the remaining portion of the brake release operation the traverse member 10 and the support lever extension 11 move closer to each other. However, as long as the tie rods 13 and 14 transmit a braking force the intermediate shaft 33 will not be able to rotate the spindle shaft 25 and 26. The drive nut 37 remains in its position in spite of the fact that it is acted upon by a torque directed in the closing direction of the uni-directional coupling 34,35 by means of the intermediate gear 24 on the held-fast intermediate shaft 33 and the forked bracket 40 is displaced by means of the pin 28 under the tension of the spring 44 in the direction toward the forked member 42.

Only after the tie rods 13 and 14 no longer transmit a braking force can the spring 44 displace the forked bracket 40 again in the direction to the traverse member 10. The drive nut 37 is then carried along by the pin 38 and because of the non-self-locking thread 36 the intermediate shaft 33 is rotated. The direction of rotation corresponds to the locking direction of the uni-directional coupling 34,35 so that the intermediate shaft 33 also rotates the intermediate gear 24 and because of the meshing gear teeth the spindle shafts 25 and 26 are rotated. The direction of rotation of the spindle shafts 25 and 26 corresponds to a threading of the spindle shafts 25 and 26 into the tubular members 29 and 30 so that the tie rods 13 and 14 are shortened. By the end of the release operation both tie rods 13 and 14 are shortened a distance corresponding to the excess of the brake stroke with respect to desired value of the brake stroke. All of the remaining components then assume the positions as shown in FIG. 5.

The rotary coupling of both spindle shafts 25 and 26 by means of the gears 22 and 23 together with the intermediate gear 24 always guarantees a uniform rotary motion of the two spindle shafts 25 and 26 so that unequal changes in the lengths of the tie rods 13 and 14 can not occur. The tie rods 13 and 14 will always have equal lengths so that there is no likelihood of any tensioning or stresses being imposed on the brake linkage because of unequal lengths of the tie rods 13 and 14.

In order to reset, that is to lengthen the tie rods 13 and 14 as would be necessary when the brake shoes 16 and 18 are replaced by new brake shoes, there can be provided a square section 45 on an end portion of the spindle shaft 25 which projects outwardly of the transverse housing 20 as shown in FIG. 5. A suitable tool, such as a wrench, can then be positioned over the square end 45 to rotate the spindle shaft 25 by hand and as a result of the meshing of the gears 23, 24 and 22 the spindle shaft 26 will be simultaneously rotated.

In order to lengthen the tie rods 13 and 14 by screwing the spindle shafts 25 and 26 out of the tubular elements 29 and 30 it is necessary to stop the operation of the arrangement together with the intermediate shaft 33 and the drive nut 37. It is preferable that the uni-directional coupling 34,35 be also constructed so as to be releasable by hand so that the intermediate gear 24 and the intermediate shaft 33 are rotatable in the locking direction of the coupling 34,35. After the uni-directionaL coupling 34,35 has been released, the spindle shafts 25 and 26 can then be rotated in the direction to lengthen the tie rods 13 and 14 by a manual turning of the square end 45 by a suitable tool as previously described.

Instead of a release device for the uni-directional coupling 34,35, a release device can be provided for the non-rotary mounting of the drive nut 37. In a simple manner a suitable release device can be provided in the form of a releasable construction with respect to the engagement of the pins 38 in the slots 39 or the release can be a detachable connection between the forked element 42 and the support lever extension 11.

The lengths of the tie rods 13 and 14 can be shortened by rotating the square end 45 in the opposite direction and thereby decrease the release play in the brakes. It is not necessary to manually disengage the uni-directional coupling 34,35 since the coupling rotates in its disengaged or unblocked direction.

It is further possible according to the present invention to provide a play in the threaded engagement of the drive nut 37 on the intermediate shaft 33 contrary to the above description. This play is proportional to the desired or predetermined release stroke. In this case the pins 38 are rotatable but are not displaceably supported in the forked bracket 40. The functioning of such a modification corresponds essentially to that as described above in the foregoing embodiment and need not be described in further detail.

It is also possible to employ a brake lever 3 which is considerably different from that illustrated in FIG. 1. In a manner similar to that described and illustrated in DE-AS No. 1 605 283 a simple brake lever can be provided the upper end of which is connected to the piston of the brake cylinder, its lower end connected to the traverse member 10 and its central portion connected to the brake shoe 6 without the adjustable features disclosed in the abovementioned DE-AS No. 1 605 283. In such a construction it is advantageous to interchange the positions of the bearing block 21 and output side of the intermediate shaft 33 with respect to the traverse member 10. A traverse housing 20 is then located on the side of the brake lever away from the vehicle wheel and the intermediate shaft 33 can be coupled by a suitable rotary mechanism with a fixed portion of the vehicle frame which, for example, could be the housing of a brake actuating unit which is rigidly mounted to the vehicle frame.

In order to protect the screw couplings 25, 27 and 26, 28 tubular extensions 46 and 47 are provided which extend outwardly from the housing 20. The tubular members 29 and 30 are slidably displaceable within the tubular extensions 46 and 47 and a suitable packing or seal is provided to guard against the entry of dirt and any foreign matter such as shown in FIG. 5.

Figure 6:
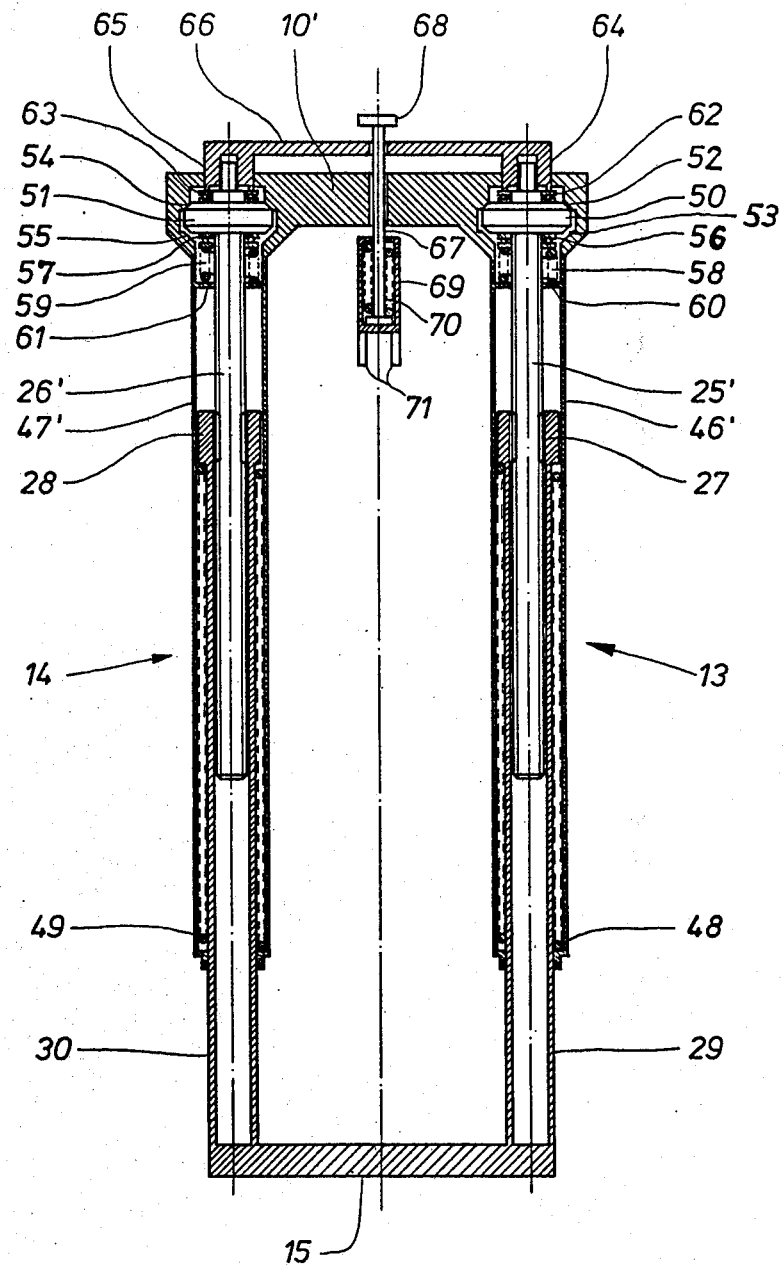
FIG. 6 is a view similar to that of FIG. 5 and showing a modification thereof.

Unlike the above-described structures, it is possible to construct a braking device utilizing known components. Such a modification is illustrated in FIG. 6 in which the traverse member 10' is provided near both its ends with tubular extensions 46' and 47'. Telescopingly received within the open ends of the tubular extensions 46' and 47' are the ends of tubular members 29 and 30 whose opposite ends are connected by the traverse member 15. A suitable seal or packing is provided between the slidingly displaceable tubular members to protect interior thereof from dirt and other foreign matter. The nuts 27 and 28 are threaded upon non-self-locking threads on the threaded spindle shafts 25' and 26'. Springs 48 and 49 are positioned in the tubular space between the ends of the tubular extensions away from the traverse member 10' and the nuts 27 and 28.

The end portions of the spindle shafts 25' and 26' within the traverse member 10' are provided with coupling flanges 50 and 51 each of which are provided with opposed conical coupling surfaces. The coupling surfaces of the coupling flanges 50 and 51 are positioned to be engageable with axially spaced coupling surfaces 52,53 and 54,55 respectively which are formed upon an inner portion of the traverse member 10'. The coupling surfaces for a coupling flange 50 or 51 are axially spaced a greater distance than the thickness of the respective flange.

On the sides of the flanges 50 and 51 toward the traverse member 15 there are provided axial or thrust bearings 56 and 57 and weak springs 58 and 59 are provided between the axial bearings 56 and 57 and internal shoulders 60 and 61 formed within the tubular extensions 46' and 47'. On the other sides of the coupling flanges 50 and 51 there are provided thrust bearings 62 and 63 which are engageable with parallel end portions 64 and 65 of a lever 66 displaceably mounted on the traverse member 10' and parallel therewith. The lever end portions 64 and 65 are positioned axially from the tubular extensions 46' and 47' and are slidable in parallel directions upon the traverse member 10'.

A rod 67 slidably passes through the central portions of the lever 66 and traverse member 10' so as to be parallel to the tubular extensions 46' and 47'. On the outer end of the rod 67 is a stop or detent 68. The detent 68 is positioned on the side of the lever 66 away from the traverse member 10' and at a distance from the lever 66 at a distance corresponding to the desired length of the brake contact stroke. The other end of the rod 67 is provided with a spring plate and is received within a spring device 69 in which there is a compression spring 70 positioned between the side of the spring plate toward the traverse member 10 and an end of the spring device. The spring 70 acts upon that end of the housing 69 which is away from the end having a forked element 79 to be connected to the support lever extension 11, not shown in FIG. 6.

In order to obtain an immediate and double-acting functioning of the adjustment device with virtually no clearance or back lash, the initial tension of the compression spring 70 is selected to be greater than the sum of the tensions of the compression springs 48 and 49 and the springs 58 and 59 are weaker than the springs 48 and 49.

When the braking device is in its released position the parts are in the positions as shown in FIG. 6. Under the forces exerted by the springs 48 and 49 acting through nuts 27 and 28 against spindle shafts 25' and 26', the coupling flanges 50 and 51 are positioned against the coupling surfaces 52 and 54 away from the spindle shafts and thus retain the spindle shafts 25' and 26' against rotation. The springs 58 and 59 also assist the forces exerted by the springs 48 and 49. The detent 68 is now positioned at a distance from the lever 66 corresponding to the clearance of the brake shoes 6 and 18 from the wheel contact surfaces.

When the brakes are moved in the braking direction, the traverse member 10' and the support lever extension 11 move in opposite directions. If the brake shoes 6 and 18 are positioned at the correct distance from the contact surface 19 of the wheel 2 the brake shoes will contact the wheel contact surface 19 at the same time that the detent 68 engages the lever 66. Subsequently, the movement of the support lever extension 11 produces a short phase of the braking stroke as result of the contact of the detent 68 with the lever 66 and at the same time the braking force transmitted by the tie rods 13 and 14 increases and overcomes the tension of the springs 48 and 49. The traverse members 10' and 15 move away from each other and the nuts 27,28 carry along the spindle shafts 25',26' so that the coupling flanges 50, 51 are disengaged from coupling surfaces 52,54 and are moved into contact against the opposite coupling surfaces 53,55. The spindle shafts 25', 26' are thus held fast against rotation. Upon further actuation of the brakes there will be an input of braking force transmitted over the braking lever 3 to the traverse member 10' over the coupling surfaces 53,55 by the coupling flanges 50, 51, the spindle shafts 25',26', the nuts 27 and 28 to the traverse member 15. The lengths of the tie rods 13 and 14 do not change. During this movement the lever 66 will be carried along by the traverse member 10' over the thrust bearings 62,63 and the extensions 64,65 and the lever 66 carries along the tie rod 67 by means of detent 68 during which the spring device 69 coupled to the support lever 11 moves in the opposite direction. The relative movement between these components is taken up by the compression of the spring 70 in the spring device 69.

During a release braking operation the parts as described above move in the opposite directions.

In the event that, for example because of wear of the brake shoes 6 and 18, the distance that the brake shoes must travel to engage the contact surface 19 at the beginning of the braking application is too great, the detent 68 will engage the lever 66 befoe the brake shoes 6 and 18 contact the braking surface 19 and this contact of the detent 68 will occur before significant braking force can be developed. During the subsequent phase of the braking application, as described above, the lever 66 under the action of detent 68 will move the support lever extension 11 by means of the spring device 69 and the tie rod 67 and, at the same time, will disengage the coupling flanges 50,51 from the coupling surfaces 52 and 54 by means of the extensions 64,65 acting upon the thrust bearings 62,63. The coupling flanges 50,51 together with their spindle shafts 25' and 26' are now rotatable and the springs 48 and 49 can now expand so that the nuts 27,28 on the rotating sprindle shafts 25',26' are now displaced in the direction toward the traverse member 10'. As result, the tie rods 13,14 are shortened until the brake shoes 6,18 contact the braking surface 19. The brake force being transmitted through the tie rods 13 and 14 overcomes the tension of the springs 48, 49 to assist further movement of the support lever extension 11 and under the force of the coupled lever 66 the coupling flanges 50,51 are pressed against contact surfaces 53,55. The spindle shafts 25',26' are now held against any further rotation and continuation of the braking application continues with a constant length of the tie rods 13,14 as described above. During a subsequent release of the brakes the brake shoes 6,18 will withdraw from the contact surface 19 according to the predetermined or desired stroke.

In the event that the clearance or play of the brake shoes 6,18 at the beginning of the braking application is too small, the brake shoes 6,18 will already engage the contact surface 19 before the detent 68 engages the end surface of the lever 66. The braking force being transmitted through the tie rods 13,14 overcomes the tension of the springs 48,49 such that the traverse members 10' and 15 slightly move apart from each other and carry along the spindle shafts 25', 26' by means of the nuts 27,28 and as a result the coupling flanges 50,51 are lifted from engagement with the coupling surfaces 52,54. The spindle shafts 25',26' are now rotatable and upon further movement of the traverse member 10' the springs 58,59 urge the spindle shafts 25',26' to be threaded out of the tubular elements 29,30. The tie rods 13,14 are thereby lengthened. As soon as detent 68 contacts the surface of the lever 66, the extensions 64,65 by means of the thrust bearings 62, 63 force the coupling flanges 50,51 against the coupling surfaces 53,55 to thus hold the spindle shafts 25',26' against further rotation. This terminates the adjusting operation and the tie rods 13,14 remain at their correct length throughout the remainder of the braking operation.

During a successive brake stroke the traverse member 10' will carry along with it the traverse member 15' by means of the coupling flanges 50,51, the spindle shafts 25',26', the nuts 27, 28 and the tubular elements 29,30 so that the brake stroke will be transferred over the second braking lever 17 to the second brake shoe 18 to engage the contact surface 19. The lever 66 together with the tie rod 67 and the detent 68 also follow the movement of traverse member 10' so that the spring 70 of the spring device 69 is compressed. The next successive release of the brakes occurs in the normal manner and by correction of the release condition the brake shoes 6 and 18 are located at their desired or normal distances from the contact surface 19.

The brake device as disclosed herein assures a joint or common control device for both the spindle shafts 25' and 26' utilizing the spring device 69 with the spring 70, the tie rod 67 with the detent 68 and the lever 66. The braking device further assures a comprehensive length adjustment device of both tie rods 13 and 14 utilizing the nuts 27 and 28 and the springs 48 and 49 to provide for a continuous uniform operation of the length adjustment device. This construction thus assures that the tie rods 13 and 14 are always changed uniformly during an adjusting process and, therefore, cannot adjust to different lengths with respect to each other. The constant uniform lengths of the tie rods 13 and 14 with respect to each other always provide a uniform transmission of brake forces from the traverse member 10 over the tie rods 13 and 14 to the traverse member 15 so as to eliminate any undesired tensions or torques in the braking device.

In the modification of FIG. 6 it is only necessary to change the spring relationships if it is desired to have the adjusting function occur during the release stroke after a braking operation instead of occurring immediately. To achieve this operation the sum of the pretensioning of the forces of the springs 48 and 49 must be greater than the pretensioning of the spring 70. Too much play between the brake shoes 6 and 18 with respect to the contact surface 19 will accummulate as an additional compression stroke of the spring 70 during the braking operation and only during the release operation while the braking force is diminishing will the untensioning of the spring 70 bring about the adjusting process. Based upon the modification of FIG. 6 it is also possible to obtain a simple adjusting function of the adjusting device by removal of the springs 58,59. The operation in such a modification of an adjusting device is known in principle and can be readily deduced from the functioning of the structure according to FIG. 6 without additional detailed explanation.

It is also apparent that according to the present invention known adjusting devices can be employed. It is only necessary that a joint control or operating device for both tie rods 13 and 14 be arranged on the traverse member 10 to function as a length adjusting device.

In the modification of FIG. 6, after replacing worn brake shoes by new brake shoes the adjusting device can be reset in the released condition of the braking device by a forceful pulling apart of the traverse members 10' and 15, such as, for example, by inserting a crow bar between the wheel contact surface 19 and the brake shoe 18 and forcing these components apart. After overcoming the initial tension of the springs 48 and 49 the tie rods 13 and 14 elongate themselves by the threading out of the spindle shafts 25' and 26' under the influence of the springs 58 and 59.

It will be understood that this invention is susceptible to modification in order to adapt it to different usages and conditions and, accordingly, it is desired to comprehend such modifications within this invention as may fall within the scope of the appended claims.

The embodiment of the invention in which an exclusive property or privilege is claimed are defined as follows:

1. In a braking device for rail vehicles, a brake actuating unit disposed to one side of a vehicle wheel, a first brake shoe positioned adjacent a contact surface of the vehicle wheel to be pressed thereagainst, a first substantially vertical pivotally mounted brake lever operatively connected to said first brake shoe and having a lower end, said first brake lever being pivotable under a reaction force with respect to a contact force of said first brake shoe applied to said vehicle wheel, a pair of parallel tie rods each having one end pivotally connected to said first brake lever lower end and extending horizontally across both faces of said wheel, a second substantially vertical pivotally mounted brake lever disposed opposite to said first brake lever with respect to said wheel and having a lower end pivotally connectd to each of the other ends of said tie rods, a second brake shoe operatively connected to said second brake lever and substantially opposite said first brake shoe to be pressed against the contact surface of said wheel, traverse means for connecting said tie rods to each other, self-actuating means on said tie rods for adjusting the play between said brake shoes and the contact surface, said adjusting means comprising a screw coupling on each of said tie rods and each screw coupling comprising a pivotable threaded spindle shaft and a nut threaded thereon, and a control device on said traverse means to actuate both of said screw couplings to adjust jointly the lengths of said tie rods.

2. In a braking device as claimed in claim 1 and further comprising transmission means on said traverse means for nonpivotably interconnecting said spindle shafts.

3. In a braking device as claimed in claim 2 wherein said transmission means comprises first and second gears respectively on said spindle shafts and an idler gear meshing with said first and second gears, said control device being connected to said idler gear.

4. In a braking device as claimed in claim 3 wherein said screw couplings are self-locking, uni-directional coupling means for connecting said idler gear with an intermediate shaft, and means for converting axial displacement to rotary motion and connecting said intermediate shaft to a pivotally mounted support lever such that displacement between said suppot lever and said intermediate shaft is converted to rotary motion.

5. In a braking lever as claimed in claim 4 wherein said uni-directional coupling has a play corresponding to a predetermined braking stroke.

6. In a braking device as claimed in claim 4 wherein said converting device has a play corresponding to a predetermined braking stroke.

7. In a braking device as claimed in claim 4 wherein said intermediate shaft has a non-self-locking thread, a stationary drive nut threaded upon said intermediate shaft and means for coupling said drive nut to said support lever.

8. In a braking device as claimed in claim 7 wherein said coupling means comprises a pin on said drive nut received within a slot in a bracket connected to said support lever, and a spring interposed between said bracket and said support lever, there being a play between said pin and slot corresponding to a predetermined braking stroke.

9. In a braking device as claimed in claim 4 and further comprising means for releasing said uni-directional coupling, and means for manually pivoting said idler gear.

10. In a braking device as claimed in claim 1 wherein said screw couplings are non-self-locking, a coupling flange on an end of each spindle shaft and engageable with fixed opposed coupling surfaces on said traverse means, first spring means urging said spindle shafts in a direction to transmit braking force, resilient stop means for acting against said spindle shaft against the force of said first spring means after a predetermined stroke, and second spring means urging said nuts into a direction to transmit braking force.

11. In a braking device as claimed in claim 10 wherein said resilient stop means comprises a lever displaceably mounted on said traverse means and having end portions engageable with ends of said spindle shafts upon which are carried said coupling flanges, said lever having a central portion engageable with a support lever through a third spring means.

12. In a braking device as claimed in claim 10 wherein each of said tie rods comprises a first tubular element having a first end telescopingly displaceable within one end of a second tubular element, said second tubular element having a second end and both said second ends being connected to said traverse means, said first tubular element having a second end and both said second ends connected to a second traverse means, said second traverse means connected to said second brake lever, the first end of said first tubular member being fixedly connected to a said nut threaded upon a said spindle shaft of a said screw coupling, said resilient top means comprising a lever displaceably mounted on said traverse means and having end portions engageable with the ends of said spindle shafts upon which said coupling flanges are mounted said lever having a central portion engageable with a support lever through a third spring means.

* * * * *